(12) United States Patent
Mower et al.

(10) Patent No.: US 11,312,330 B1
(45) Date of Patent: Apr. 26, 2022

(54) SYSTEM AND METHOD FOR KEYLESS OPERATION OF VEHICLE IGNITION

(71) Applicant: InterMotive, Inc., Auburn, CA (US)

(72) Inventors: Dan C. Mower, Grass Valley, CA (US); Erin M. West, Auburn, CA (US); Gregory E. Schafer, Incline Village, NV (US); Ken J. Quimby, Rocklin, CA (US); Bryan M. Elzy, Newcastle, CA (US)

(73) Assignee: Intermotive, Inc., Auburn, CA (US)

( * ) Notice: Subject to any disclaimer, the term of this patent is extended or adjusted under 35 U.S.C. 154(b) by 230 days.

(21) Appl. No.: 16/262,300

(22) Filed: Jan. 30, 2019

Related U.S. Application Data

(60) Provisional application No. 62/624,019, filed on Jan. 30, 2018.

(51) Int. Cl.
*B60R 25/20* (2013.01)
*B60R 25/24* (2013.01)

(52) U.S. Cl.
CPC .......... *B60R 25/209* (2013.01); *B60R 25/24* (2013.01); *F02N 2300/20* (2013.01)

(58) Field of Classification Search
CPC .... B60R 25/209; B60R 25/24; F02N 2300/20
See application file for complete search history.

(56) References Cited

U.S. PATENT DOCUMENTS

| 6,573,615 | B1* | 6/2003 | Asakura | B60R 25/04 307/10.2 |
| 7,545,258 | B2* | 6/2009 | Endo | B60R 25/042 340/426.11 |
| 7,897,888 | B2* | 3/2011 | Dimig | H01H 9/0235 200/302.2 |
| 8,487,740 | B2* | 7/2013 | Tsuruta | G07C 9/00309 340/5.22 |
| 9,865,110 | B2* | 1/2018 | Link, II | G06F 21/34 |
| 2014/0210677 | A1* | 7/2014 | Fahlbusch | H01Q 1/3241 343/713 |

* cited by examiner

*Primary Examiner* — Thomas Ingram
*Assistant Examiner* — Omar K Morsy
(74) *Attorney, Agent, or Firm* — Heisler & Associates

(57) ABSTRACT

A switch is interposed between an ignition antenna associated with a vehicle ignition switch and an auxiliary antenna located spaced from the ignition switch. A reader is selectively connected through the switch to either the ignition antenna or to the auxiliary antenna, the reader configured to determine if an authorized key is present adjacent to an antenna. An authorized key is kept adjacent to the auxiliary antenna. The vehicle ignition switch can be operated either with an authorized key brought adjacent to the ignition switch and adjacent to the ignition antenna or by adjusting the switch to connect the reader to the auxiliary antenna to read the authorized key kept adjacent thereto. A controller can cause this switch to adjust from connecting the reader to the ignition antenna to connecting the reader to the auxiliary antenna, so that the controller can automatically cause vehicle ignition operation when desired.

19 Claims, 2 Drawing Sheets

SYSTEM AND METHOD FOR KEYLESS OPERATION OF VEHICLE IGNITION

CROSS-REFERENCE TO RELATED APPLICATIONS

This application claims benefit under Title 35, United States Code § 119(e) of U.S. Provisional Application No. 62/624,019 filed on Jan. 30, 2018.

FIELD OF THE INVENTION

The following invention relates to ignition systems for operation of a vehicle. More particularly, this invention relates to systems and methods for allowing automated vehicle ignition system and engine operation when desired, such as to enable functioning of some beneficial subsystem associated with the vehicle, and without requiring that an individual place an authorized key, or keyless fob, adjacent to an ignition switch of the vehicle.

BACKGROUND OF THE INVENTION

Smart Keys—Modern automobiles use more than just a mechanical key to prevent theft. Smart keys, such as that depicted in FIG. 1, initially were developed to improve anti-theft systems, by incorporating a passive RFID (or equivalent) integrated circuit (chip) with an identification tag which the vehicle reads for identification purposes before allowing the mechanical key to start the engine. No battery is required to power the chip, as it is powered from the Radio Frequency (RF) signal from the ignition switch "reader." This technology requires the RFID chip to be in close proximity to the reader's RF antenna. The part of the vehicle system which prevents engine starting without proper chip identification is sometimes referred to as an immobilizer, as it immobilizes the vehicle if the chip cannot be read and identified. This prevents "hot wiring" the vehicle using just the ignition switch wires to simulate "key in" Start and Run.

Key Fobs—Mechanical keys with fobs later appeared, such as that depicted in FIG. 2, with the fob providing the RFID chip, but also adding features such as remote keyless entry, door lock/unlock, and frequently a panic button which would typically sound the vehicle's horn. The remote features require the fob to have a battery to power RF transmissions from the fob to the vehicle, however the passive RFID engine starting function still exists and does not require the battery, as it is still only used in close proximity to the ignition switch reader antenna. A dead fob battery will prevent remotely locking/unlocking the doors, but will not prevent starting the vehicle as it is not needed for the passive RFID identification.

Active RFID Fobs—These types of keyless fobs are the current state-of-the-art technology in common use in vehicles, such as that depicted in FIG. 3. The active RFID technology uses a battery to power the circuitry and does not require the fob to be in close proximity to the reader to start the engine. This allows fob communication and identification a few meters or more from the reader. This allows the vehicle to both automatically unlock the doors when the fob is detected, and also allows a pushbutton start/stop button to be used instead of a mechanical key. These systems typically have the vehicle send out a query RF message to the fob. If the fob is in range, it will respond with its own RF transmission. If the vehicle identifies the fob as one authorized for this vehicle it will unlock the door(s) and allow the start/stop pushbutton to start the engine.

Adding Authorized Fobs—Additional fobs may be purchased from a dealer and paired to the vehicle, thus they can be recognized as an authorized fob. Adding an additional authorized fob may be desirable when using this invention, as one fob is required to be permanently installed in a hidden enclosure box (or other secure location) inside the vehicle.

Start/Stop Technology—Shutting down an internal combustion engine when not being used has the advantage of saving fuel cost, and is also beneficial to the environment by reducing emissions. This technology is being designed into automobiles more frequently as time goes on. There are many applications of fleet vehicles which could benefit from this stop/start technology in the areas of work trucks, transit buses, ambulances, and so on, should systems be available to retrofit this technology onto vehicles which do not come equipped with such systems.

Problem

Wiring an aftermarket start/stop system into the vehicle ignition switch can provide the appropriate electrical signals to simulate the key being inserted and turned to Accessory, Run, and Start, however, the vehicle's immobilizer system will not allow the engine to start unless it detects an authorized smart key or fob. While this provides increased vehicle security and theft prevention, it also can prevent aftermarket vehicle modifications to support auto start/stop capabilities and all of the attendant benefits.

Numerous vehicle applications exist which have a legitimate need for auto engine start/stop without a key in the ignition, or a keyless fob within range of the reader. Leaving the key in the ignition or fob in the vehicle without the driver/operator present poses a large risk for vehicle theft.

There are significant benefits to be gained on work vehicles by automatically shutting down the engine when not needed, then automatically restarting when conditions dictate. Fuel savings, minimized emissions, minimizing engine wear and servicing requirements are just a few of the benefits of auto shutdown and restart technologies. However, leaving the key or fob in the vehicle poses an obvious theft risk.

Examples of vehicles in this category include, but are not limited to the following:

- Work trucks where the operator is not in the cab, such as boom trucks where the operator is up in a basket working on utility lines. The worker in the basket may need the ability to remote start the engine in order to gain hydraulic control of the boom or to activate/replenish other systems in the vehicle.
- Work trucks which have battery operated systems which may need the engine automatically restarted to charge the batteries.
- Spray trucks where the operator may be some distance away from the running vehicle.
- Recreational Vehicles which have a battery pack that requires auto restarting of the engine to maintain battery charge.
- K9 police vehicles needing an engine auto restart and air conditioner activation to maintain proper cabin interior temperature.
- Ambulance vehicles.
- Transit buses.
- Any vocational vehicle with a battery system that uses the main vehicle engine to maintain battery charge, while at the same time allowing engine cycling (stopping and starting the engine) to save fuel.

Solutions

Being able to automatically restart the engine without the presence of the smart key or key fob in the ignition for passive RFID systems, or leaving the fob in the vehicle for active RFID systems, is the challenge. The vehicle immobilizer must communicate with an authorized RFID (or similar technology) chip before it will allow an engine start.

Existing solutions—One solution places an authorized key or fob in a hidden box and relocates the reader antenna from the ignition switch to the box. This allows the aftermarket start/stop system to electrically simulate the ignition switch changing from Off to Run, to Start and start the engine. The immobilizer is satisfied as it communicates with the fob or key chip in the box. The key or fob placed in the box must be one which has been paired with the vehicle and is thus an authorized fob. The disadvantage of this approach is that the authorized key or fob is always present, which allows hot wiring the vehicle, or picking the ignition switch lock mechanism, or using a mechanical only key to start and potentially steal the vehicle.

Simplest Solution—Another solution is to have the operator/driver start the vehicle normally with the key/fob, then activate the aftermarket start/stop system, at which point the system takes control of the ignition switch wiring. This allows the operator to remove the key/fob while the start/stop system keeps the switch wiring to appear as though the key is still in Run. This allows the key to be removed with the engine running.

When the start/stop system determines the engine can be shut off, it can do so by simulating the key changing from Run to Accessory. This will shut the engine off while still maintaining the fob security access that was attained during initial engine start. This allows cycling the engine on/off without the need for the reader to access the fob. The downside to this approach is the ignition switch must be left in the Accessory position with engine off. If the ignition switch wiring should indicate the key is in the Off position, then the reader must re-establish fob security access to restart the engine.

Leaving the key switch in the Accessory position is not the lowest power consumption state of the chassis since it will leave various accessories on, such as the radio, heater/AC blower and so on. This generally will cause an engine restart sooner than otherwise, as the start/stop system typically monitors the vehicle battery to maintain the state of charge. A better solution is to simulate the key position to the Off state, thus minimizing battery discharge while the engine is off. This however requires re-establishing fob security access.

SUMMARY OF THE INVENTION

This invention leaves the OEM immobilizer antenna in place near the ignition switch, but creates a secondary or auxiliary antenna in a secure location spaced from the ignition switch. An authorized key is also at this secure location. The aftermarket start/stop system switches between the two antennas only as needed. Only one antenna is active at a time. The auxiliary reader antenna in the box (or other secure location) is preferably only activated when the start/stop system needs to start the engine, thus the key or fob in the box does not normally satisfy the OEM immobilizer system by presenting an authorized chip, unless the aftermarket start/stop system is in control and starting the engine. This has vehicle anti-theft advantages.

Furthermore, in the case of combination key/fob systems (and others), removing the mechanical key permanently from the fob before placing it in the box will prevent vehicle theft in the event the box is discovered by a would-be thief.

Preventing Vehicle Theft When the Engine is Running with Vehicle Unattended.

Electrically locking the shifter in Park, and or shutting the engine off when someone attempts to shift the vehicle out of Park to drive it will prevent vehicle theft while the start/stop system is in control.

Active Fob Solution

An active fob (also called a keyless fob in some embodiments) is one with a battery that will allow entering and starting the vehicle without close proximity between the fob and the reader. Vehicles with this technology typically have an engine start/stop button, and the fob just needs to be detected anywhere inside the vehicle. The fob battery provides the necessary power for the fob to transmit RF messages over 1-2 meters to communicate with the vehicle's reader. With these systems, placing an authorized fob in a hidden box inside the vehicle would allow anyone, anytime, to start and drive the vehicle, thus creating an unacceptable easy-to-steal scenario.

In this situation, one solution presented here is to remove the battery from the active fob, replacing it with a battery simulator which is wired to the aftermarket start/stop system and a controllable switch. The start/stop system can provide or remove power from the battery simulator, thus enabling the active RFID fob or disabling it. When the aftermarket start/stop system or other controller wants to start the vehicle, it provides power to the battery simulator, thus powering up the active fob. This allows the vehicle to detect this authorized but hidden fob, and allows the ignition switch connection to start the vehicle by simulating Run and Start functions.

Active fobs are designed to be able to start the vehicle even with a dead fob battery. They do this by using passive RFID technology, where the fob must be placed in very close proximity to the start/stop button. This means if the active fob was discovered in the hidden box, and removed, even with the battery simulator shut off, it could be used to start and drive the vehicle.

Vehicle Shift Lock—Light duty vehicles are required to provide a shift lock mechanism that prevents shifting the transmission out of park unless the Service Brake is pressed. There are various ways to control this shift lock mechanism by aftermarket systems. Sometimes it is possible to lock the shifter in Park over the vehicle's CAN network, on other chassis it may require connecting directly to and driving the shift lock solenoid by the aftermarket start/stop system. Locking the shifter when the vehicle is running but unattended provides additional anti-theft protection.

OBJECTS OF THE INVENTION

Accordingly, a primary object of the present invention is to provide control over operation of an ignition switch of a vehicle without requiring the physical presence of an authorized key adjacent to the ignition switch.

Another object of the present invention is to facilitate operation of subsystems which require that a vehicle engine be started (and/or stopped), without requiring an authorized key (or keyless fob) to be brought adjacent to the ignition switch of the vehicle.

Another object of the present invention is to facilitate retrofitting of subsystems onto a vehicle which does not have automatic engine starting and stopping capability, to be retrofitted with functionality to enable automatic starting and stopping of the vehicle.

Another object of the present invention is to provide a system and method for causing operation of a vehicle ignition switch without bringing an authorized key adjacent to the ignition switch, while still preventing vehicle motion and while still providing theft deterrent.

Another object of the present invention is to provide a method for controlling an ignition switch of a vehicle which can occur automatically when vehicle engine operation is called for by a controller.

Another object of the present invention is to provide a system for retrofitting onto vehicles which cannot automatically start and stop the engine to have the ability to automatically start and stop the engine.

Another object of the present invention is to provide a system and method for turning on a vehicle engine when a subsystem requires that the vehicle engine be turned on, such as to allow for recharging of batteries associated with the vehicle periodically, or to cycle the air conditioning system of the vehicle, in an automated fashion or on demand from a remote location.

Another object of the present invention is to provide a system and method for operating an ignition switch of a vehicle which can be adapted for use with vehicle ignition systems design for operation with a smart mechanical key, or a mechanical key with associated fob, or for a keyless fob.

Another object of the present invention is to maintain and/or provide theft deterrence while also facilitating automatic operation of a vehicle ignition system.

Other further objects of the present invention will become apparent from a careful reading of the included drawing figures, the claims and detailed description of the invention.

DESCRIPTION OF THE PREFERRED EMBODIMENT

Figure 1:
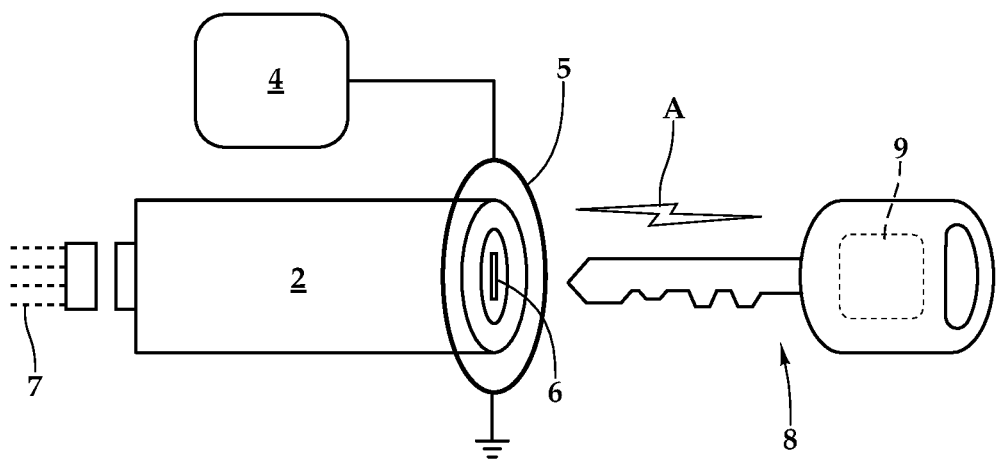
FIG. 1 is a schematic of an ignition system according to the prior art which is configured for use with a smart key which has both a mechanical key blade and an RFID or other radio frequency based system for validation of key authorization.

Referring to the drawings, wherein like reference numerals represent like parts throughout the various drawing figures, reference numeral 30 is directed to a switch which is interposed into an ignition system of a vehicle, the ignition system including an ignition switch 2 therein. The switch 30 (FIG. 4) provides a system and/or method which allows the ignition switch 2 to operate normally or for the ignition switch 2 and associated ignition system to separately commence operation by adjusting the switch 30 to have a reader 4, 116 selectively coupled to an auxiliary antenna 40 at a separate secure location 20 with a separate authorized key 8, 12 adjacent thereto, or keyless fob 112, to allow automatic control of the vehicle ignition system and to facilitate vehicle operation when desired.

Figure 4:
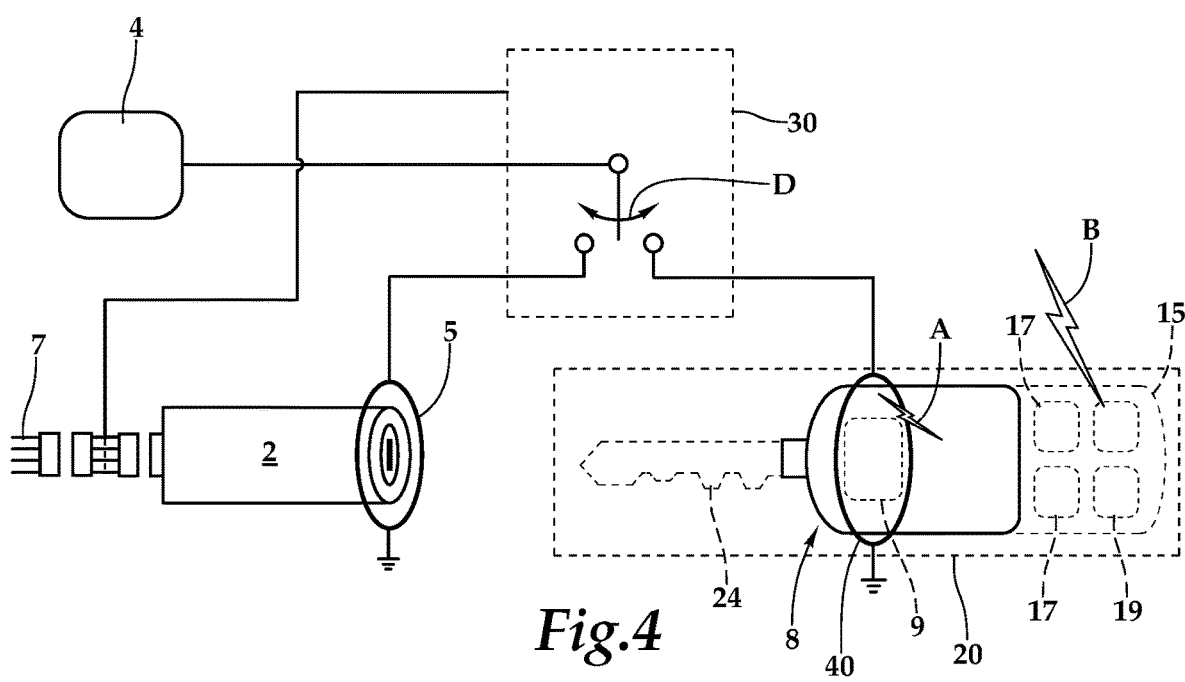
FIG. 4 is a schematic of an ignition system modified from those of FIGS. 1-3 according to this invention to facilitate ignition system operation with or without the presence of an authorized key (or keyless fob) being brought adjacent to the ignition system, and so that vehicle subsystems requiring vehicle operation can operate automatically and start the vehicle when needed.

In essence, and with particular reference to FIG. 4, basic details of the invention are described according to certain exemplary embodiments. The ignition system includes an ignition switch 2 that is provided so that an authorized key 8, 12, 112 can operate the ignition and cause vehicle operation, including starting of a vehicle engine or similar operation of power systems of the vehicle. Similar to prior art ignition systems, an RFID reader 4 is coupled to an antenna 5 adjacent to the ignition switch 2. An authorized key such as mechanical key 8 (FIG. 1) or key/fob assembly 12 is brought adjacent to the ignition switch 2 with a blade accessing a key slot 6 of the ignition switch 2, and also bringing a chip 9 adjacent to the antenna 5 which can interact with signals from the RFID reader 4 to verify key 8, 12 authenticity.

Uniquely with this invention, a second auxiliary reader antenna 40 is provided at a separate location 20 and wired to the RFID reader 4 through a switch 30. A second authorized key 8, 12 is placed adjacent to this auxiliary reader antenna 40. Thus, the ignition system can be satisfied that an authorized key is present either by a key 8, 12 being brought adjacent to and interacting with the reader 4, and with the switch 30 connecting the reader 4 to the ignition antenna 5, or by having the switch 30 connect the reader 4 to the auxiliary reader antenna 40, so that the ignition system detects the second authorized key 8, 12 adjacent to the auxiliary antenna 40. This allows for verification of authenticity and allows operation of the vehicle ignition system without necessarily requiring that a key 8, 12 be brought adjacent to the ignition switch 2, and thus enabling automatic operation of the ignition system of the vehicle, such as when called for by subsystem which requires vehicle operation.

More specifically, and with particular reference to FIG. 1, details of a prior art ignition system are described, which this invention can modify according to one embodiment of this invention. In the ignition system depicted in FIG. 1, a mechanical key 8, also referred to as a "smart key" is utilized as part of the ignition system. This key 8 includes a mechanical blade extending from a body which is typically enlarged to be easily gripped by a hand of a user. Embedded within this body (or elsewhere on the key 8) is a chip 9 or other device which can interact with signals from a reader 4. This reader 4 is typically an RFID reader 4 which is coupled to an antenna 5 adjacent to the ignition switch 2.

Ignition switch 2 also includes a key slot 6 which leads into the ignition switch 2 and an associated lock mechanism, and is wired, along a wiring harness 7, to other electrical systems within the vehicle which can effectuate vehicle operation, including starting of an engine of the vehicle or otherwise enabling vehicle operation. The RFID reader 4 can detect the presence of the chip 9 (by interaction A) even though the chip 9 within the mechanical key 8 is typically not powered, utilizing passive RFID technology or similar RF technology or other electromagnetic transmission technology.

Such an ignition system provides some additional degree of theft deterrent over a "non-smart" mechanical key, in that the ignition switch 2 cannot merely be "hot-wired" to operate the ignition system. Rather, both the ignition switch 2 must be satisfied that the appropriate blade of the mechanical key 8 is inserted within the key slot 6 and into the ignition switch 2, and also the chip 9 within the key 8 must be recognized by the reader 4 as being an authorized key, before the ignition system can be operated. Additional theft deterrent is a thus enabled.

Figure 2:
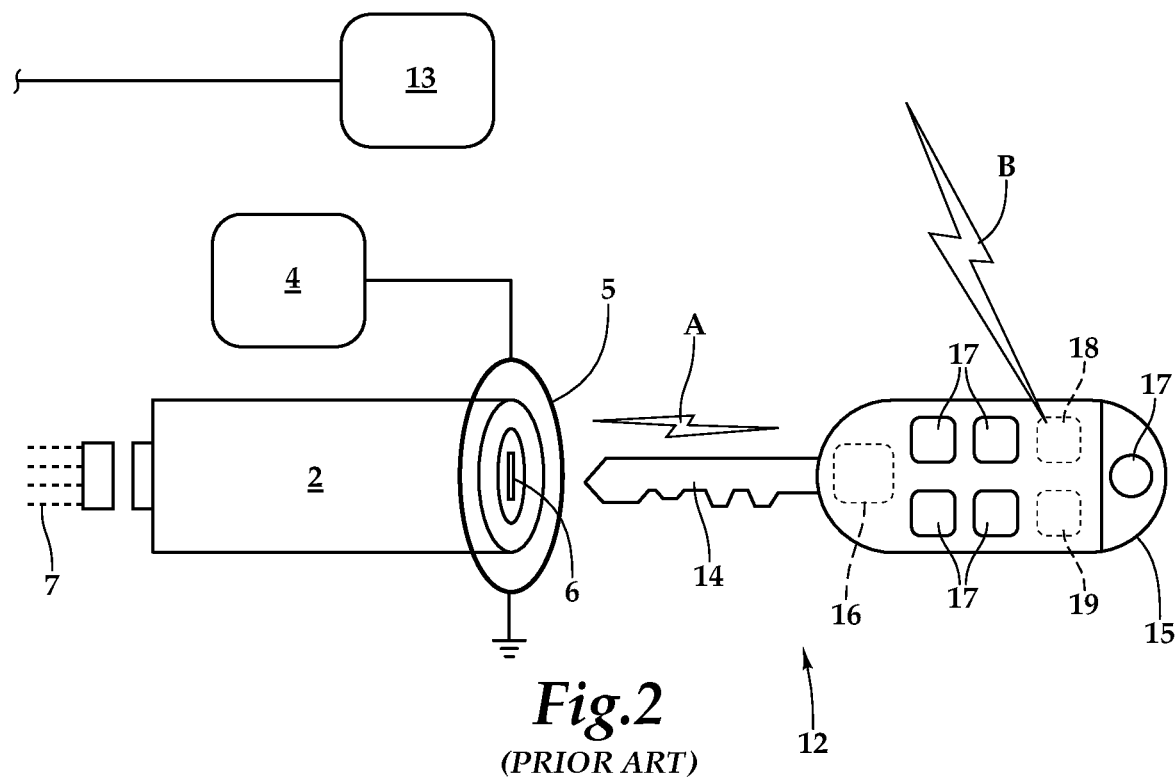
FIG. 2 is a schematic of an ignition system according to the prior art which is configured for use with a smart key with included fob which utilizes both an RFID or other radio frequency based system for validation of key authorization, as well as a battery powered transmitter for communication between the key fob and various subsystems of the vehicle, from a greater distance and including from outside of the vehicle.

With particular reference to FIG. 2, details of a second prior art ignition system are described which is slightly modified from that which is depicted in FIG. 1, and which also can be modified according to this invention to provide the benefits associated with this invention. With the ignition system of FIG. 2, the same ignition switch 2 has a reader 4 and associated antenna 5, as well as a key slot 6. A key/fob assembly 12 is provided which is slightly different from the mechanical key 8 (FIG. 1) in that it includes both a blade 14 and a body 15, and includes a chip 16 which is generally similar to the key 8 and chip 9 of the embodiment of FIG. 1, but also includes other functionality, generally contained within the body 15 (also called a fob in many instances) and further interacting with an RF receiver 13 associated with the vehicle (a variation of this prior art ignition system involves a fob coupled through a key ring or otherwise in a removable fashion to a mechanical key 12 with a blade 8).

To provide other functionality, the body 15 typically supports a series of buttons 17 which are configured to perform different functions. An RF transmitter 18 is located within the body 15 or otherwise associated with the key/fob assembly 12. A battery 19 is provided as well, primarily to power the RF transmitter 18, and any circuitry between the buttons 17 and the transmitter 18. The transmitter 18 sends a signal (by interaction B) with the RF receiver 13 associated with the vehicle. This interaction B is distinct from the interaction A between the chip 16 and the antenna 5 associated with the reader 4. In particular, the buttons 17 can be provided so that when they are depressed the transmitter 18 causes a signal to be emitted and read by the receiver 13 which can cause functions such as door unlock, trunk unlock, sounding of the vehicle horn, and other remote functionality. The transmitter 18 is able to interact with the receiver 13 over a significantly greater distance then the close proximity passive RFID interaction A between the chip 16 and the antenna 5 of the reader 4. In particular, the transmitter 18 and receiver 13 can typically operate when the key/fob assembly 12 is still outside of the vehicle, and perhaps many steps of a user away from the vehicle.

Figure 3:
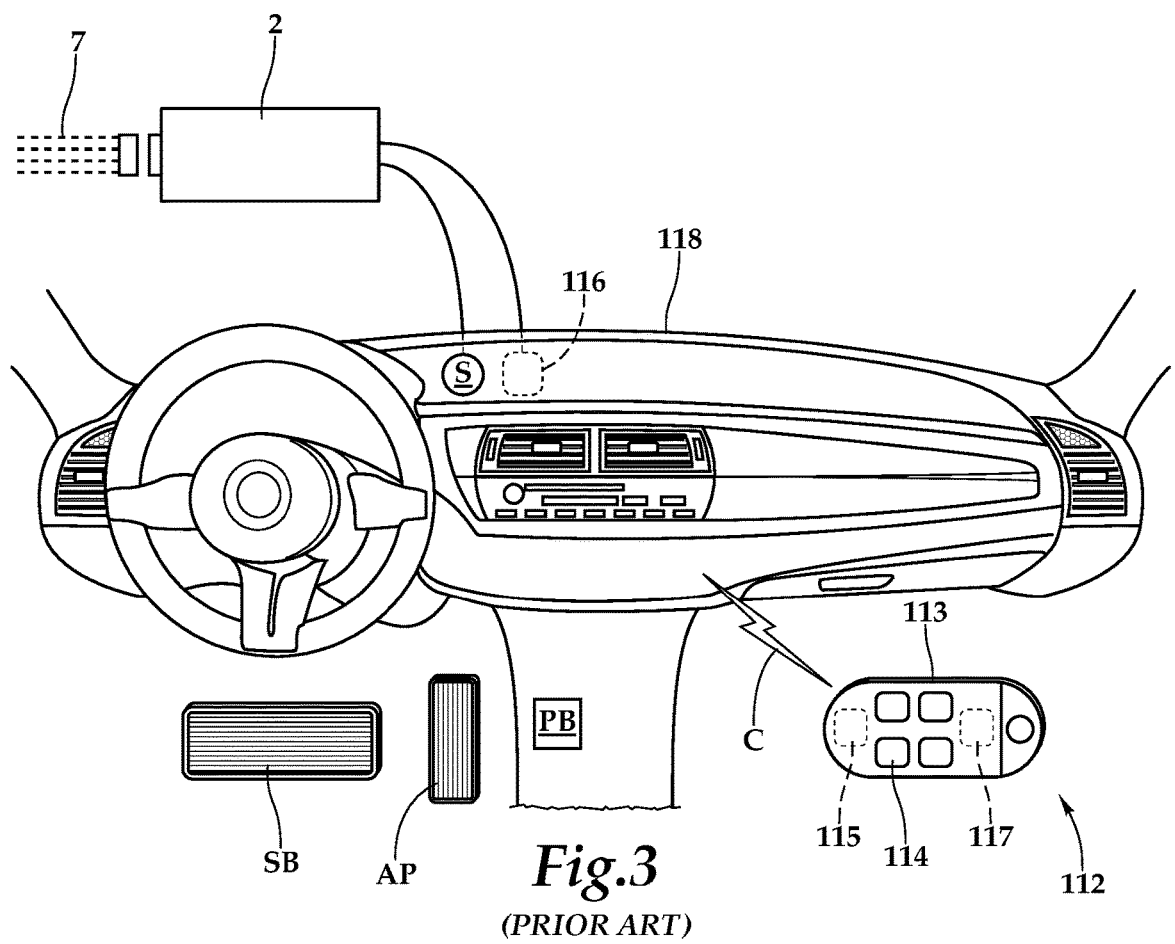
FIG. 3 is a schematic of an ignition system according to the prior art which is configured for use with a keyless fob which utilizes active RFID or other powered RF or other transmission technology to remotely communicate with the ignition system of the vehicle that an authorized key fob is present adjacent the vehicle, for authorized vehicle operation.

With particular reference to FIG. 3, details of a third prior art ignition system are described, which the system of this invention can also be configured to modify to provide the benefits of this invention. In the ignition system of FIG. 3, a keyless fob 112 is provided rather than a mechanical key 8 or key/fob assembly 12 (FIGS. 1 and 2). Rather than utilizing passive RFID, an active RFID transmitter chip 115 is located within a body 113 which can interact with an active RFID reader 116, which is typically placed somewhere in the vehicle, and generally near a dashboard 118 of a vehicle.

Typically no mechanical key is associated with this keyless fob 112. Buttons 114 on the keyless fob 112 have a function similar to the buttons 17 in the key/fob assembly 12 (FIG. 2). A battery 117 is also provided within the body 113 which powers a circuit associated with the active transmitter chip 115 and buttons 114 to power the keyless fob 112.

In this prior art system, an interaction C occurs between the active transmitter chip 115 and the active RFID reader 116 (or equivalent RF or other electromagnetic transmission technology) to communicate that an authorized fob is adjacent to the vehicle, and to allow vehicle operation. The ignition switch 2 does not typically include a key slot, but rather is wired to a start/stop button S that can be pushed by an operator. When this start/stop button S is pushed, and the presence of the active transmitter chip 115 in the keyless fob 112 is detected by the active RFID reader 116, ignition switch 2 and/or vehicle security algorithm is satisfied and signals are sent along the wiring harness 7 to allow vehicle operation.

Other typical prior art elements of such a vehicle having a keyless fob 112, and also similar with other vehicles is the inclusion of a service brake pedal SB, an accelerator pedal AP and a parking brake PB, which can be manual or electronic (with an electronic parking brake PB depicted in FIG. 3). The system of this invention can be caused to operate with such a keyless fob 112 in a slightly modified manner from that associated with other prior art ignition systems such as those depicted in FIGS. 1 and 2, as described in detail below.

With particular reference to FIG. 4, details of a modified ignition system according to this invention are described. This modified ignition system could be modified from corresponding prior art ignition systems either as original equipment manufactured into the vehicle, or as a retrofit kit which could be retrofitted onto an existing vehicle. In a simplest form of the invention, a smart key 8 and associated ignition system (FIG. 1) are modified to include a switch 30 (FIG. 4) between the reader 4 and the antenna 5. Furthermore, an auxiliary antenna 40 is provided at a secure location 20 on the vehicle with this auxiliary antenna 40 also wired to the switch 30. A switching element within the switch 30 can toggle (along arrow D of FIG. 4) between connecting the reader 4 to the antenna 5 adjacent to the ignition switch 2, or having the reader 4 active with the auxiliary antenna 40 at the secure location 20.

At the secure location, an authorized key 8, 12 is placed adjacent to the auxiliary antenna 40. This secure location 20 could be a hidden location on the vehicle. As another alternative, the secure location 20 could be a locked box in a known location on the vehicle. As one example, the box could be locked with a combination lock. Fleet operators would have service personnel who know what this combination code is (or it can be communicated to them) so that the lockbox can be accessed when needed, but unauthorized personnel would not be able to access the key within the locked box.

Providers of such a system or users could perhaps determine whether they would consider a hidden location to be more secure or for a locked box location to be more secure. Also, the metal key blade could be removed, preventing vehicle theft. The auxiliary antenna 40 is either placed inside of this secure location or, if outside of the secure location, boundaries of the secure location are sufficiently transparent to RF radiation or other electromagnetic radiation associated with the auxiliary antenna 40, so that the auxiliary antenna 40 is always reading the presence of the authorized key 8, 12 at the secure location 20. This authorized key 8, 12 could be similar to the mechanical key 8 of the prior art system of FIG. 1 or the key/fob assembly 12 of the prior art system of FIG. 2.

As will be apparent, when the switch 30 connects the reader 4 to the auxiliary antenna 40, the reader 4 will always detect the presence of an authorized key. In many vehicle ignition systems and other electronics systems associated with the vehicle, ignition switch 2 can be satisfied that vehicle ignition system operation is authorized in a variety of different ways. In some systems, simple rewiring, somewhat similar in some cases to that of "hot-wiring" the ignition system, could be utilized to bypass the ignition switch 2 sufficiently to allow operation of the ignition system when it also detects the authorized key 8, 12 through the reader 4 being connected to the auxiliary antenna 40 through the switch 30. In some vehicles, some levels of vehicle operation can occur merely when the RFID reader 4 detects the presence of an authorized key, and without placing of a blade of a mechanical key 8 (or blade 14 of a key/fob assembly 12) into the key slot 6 of the ignition switch 2, so that no modification of wiring associated with the ignition switch 2 or other wiring of the vehicle's electrical systems might be necessary.

The system of this invention thus facilitates operation of the vehicle ignition system and operation of the vehicle, including starting of an engine associated therewith, either with the switch 30 connecting the reader 4 to the auxiliary antenna 40 (and possibly appropriate modification of the wiring between vehicle electrical systems and the ignition switch 2) or by having the switch 30 connecting the reader 4 to the ignition antenna 5 and placing of the key 6, 12 adjacent to the ignition switch 2, and with a blade 14 thereof interacting with the key slot 6, for standard and traditional operation of the ignition system and starting of the engine and other systems associated with the vehicle. Beneficially, the first mode of operation through the auxiliary antenna 40 can occur in an automated fashion, by having the switch 30 connect the reader 4 to the auxiliary antenna 40 when desired, such as for operating a vehicle subsystem which requires operation of the ignition system, and/or automatically starting/stopping of an engine associated with the vehicle or other equipment on the vehicle.

Various examples of such systems are described above in the background of the invention section of this application. As one example, a canine police vehicle may benefit from being able to automatically turn on an air conditioner system of the vehicle (which typically requires the engine of the vehicle to be running), such as when a canine officer is remaining within the vehicle. Such a system might include temperature sensors, elapsed time sensors, canine officer presence sensors and other sensors within a control system. When a control system detects a series of conditions which might jeopardize the health of the canine officer if the air conditioning system is not turned on, the control system can cause the switch 30 to toggle (along arrow D) to connect the reader 4 to the auxiliary antenna 40. The reader 4 will then detect the presence of an authorized key.

The controller will then cause the vehicle ignition system to be operated to start the engine of the vehicle. Air conditioning subsystems of the vehicle will then be activated to cause air of appropriate temperature and appropriate freshness to be channeled into an interior of the vehicle. After conditions indicate that operation of the subsystem is no longer required, the control system can turn off the engine. In such a system, and for most systems according to this invention, a default position for the switch 30 is to have the reader 4 coupled to the ignition antenna 5. Only when conditions exist where the controller needs to bypass the ignition antenna 5, does the switch 30 move (along arrow D) to connect the reader 4 to the auxiliary antenna 40 to detect the separate authorized key at the secure location, and to facilitate subsystem operation. In a similar fashion, other vehicle subsystems could be caused to operate, by appropriate modifications to the control system according to this invention.

In addition to the features of the system described above, preferably enhanced vehicle theft deterrent is also implemented. For instance, when the subsystem has caused operation of the ignition system by toggling of the switch 30 and utilization of the auxiliary antenna 40 and authorized key 6, 8 at the secured location 20, an electronic parking brake of the vehicle can be activated, and prevent it from being deactivated. As another alternative, if while such automatic operation of the vehicle is occurring an attempt is made to shift a transmission of the vehicle out of park, such as by depressing the service brake SB of the vehicle (FIG. 3) the vehicle can be caused to have its engine turned off and lock the switch 30 in position connecting the reader 4 to the antenna 5 adjacent to the ignition switch 2, so that original theft deterrent features are all made active. In this way, the benefits of automated operation of the ignition system and vehicle engine can occur without compromising safety or risk of theft.

With further reference to FIG. 4, in one embodiment the mechanical key 8 blade, or the blade 14 associated with the key/fob 12 can be broken off (or removed) to present a broken off mechanical key 24 at the secure location 20. In this way, if a thief were to find the authorized key or break into a locked container at the secure location 20 to access the authorized key, the authorized key would not have the appropriate hardware for interaction with the key slot 6 of ignition switch 2, so that theft protection by compromising the secure location 20 would be less effective.

With particular reference to FIGS. 3 and 4 together, details of an alternative embodiment of this invention are described where the vehicle ignition system is configured for use with a keyless fob 112. In such an embodiment, the secure location 20 would include the body 113 of the keyless fob 112 therein, and no mechanical key blade would be provided. Such a keyless fob 112 can also be generally referred to as a "key" or as a form of "key" but is a form of "key" which does not include a blade associated therewith, as do the other keys described herein. For convenience, such keys which do not include a mechanical blade are often referred to as a fob or a keyless fob, to distinguish them from a mechanical key that includes both a blade and a body 15 including a transmitter 18 and battery 19 therein (FIG. 2).

Because the keyless fob 112 includes an active RFID transmitter chip 115 or other form of far acting RF transmitter which interacts with an active RFID reader 116 or similar long range active reader receiver, presence of the secure location 20 within the vehicle and away from the ignition switch 2 is not sufficient to keep the second authorized keyless fob 112 from always satisfying the reader 4, 116. As one alternative, the secure location 20 can be provided as an enclosure which blocks all RF or other associated electromagnetic transmissions, and then includes an appropriate auxiliary antenna or other receiver inside of this RF blocking enclosure. As one example, the secure location 20 could be surrounded by a gaussian shield (or a faraday shield or faraday cage) completely surrounding the secure location 20. This might be a small box formed of electrically conductive metal (i.e. aluminum) which can be locked or hidden and which is sized to contain the keyless fob therein.

As an option, the battery 19, 117 within the keyless fob 112 can be replaced with a battery simulator. Such a battery simulator would have a mechanical shape and size which would allow it to make appropriate contacts within the keyless fob 112 to provide power within the keyless fob 112. This battery simulator would be wired into the switch 30. In such an embodiment including the battery simulator, power would typically always be going to the active RFID receiver 116, 4. However, when the switch is toggled, such as automatically by a subsystem which requires detection of the presence of an authorized key, the battery simulator would be switched to receive power and supply power to the key fob so the key fob would be detected as present by the receiver 116, 4. Otherwise, a default position for the battery simulator would be "off" and unpowered for the keyless fob 112. Thus, in the default condition, the keyless fob 112 would be unpowered and would not be detected.

Vehicle operation would require a separate fob 112, such as that carried by an authorized user on the person of the authorized user. Then, when a system requires operation of the ignition system of the vehicle, such as to start the engine of the vehicle, such a subsystem would toggle the switch 30 to cause power to be sent to the battery simulator and to power the keyless fob 112 at the secure location 20, and particularly the active RFID transmitter 115 of the keyless fob 112. The authorized keyless fob 112 would thus be detected and operation of the ignition system and starting of the engine would be enabled. Other systems according to this invention would be similar in this embodiment, except that powering and unpowering of the battery simulator would replace enabling or disabling the auxiliary antenna 40 (FIG. 4) associated with other embodiments of this invention.

While the switch 30 is depicted as only connecting the reader 4 to either the ignition antenna 5 adjacent to the ignition system 2, or connected to the auxiliary antenna 40 at the secure location 20, as an alternative, the antenna 5 adjacent to the ignition system 2 can always remain actively coupled to the reader 4, and the switch 30 only selectively adds a further connection between the reader 4 and the auxiliary antenna 40. Thus, systems are contemplated where the ignition antenna 5 always remains actively coupled to the reader 4, as well as systems where the ignition antenna 5 is temporarily interrupted from connection to the reader 4 when the auxiliary antenna 40 is instead coupled to the reader 4 through the switch 30. It is also conceivable that the default position could be other than connecting the reader 4 to the ignition antenna 5, such as by having the default position be a neutral position with neither antenna 5, 40 coupled to the reader 4.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for automated operation of a vehicle ignition, comprising in combination:
    an ignition switch of a vehicle;
    an ignition antenna adjacent to said ignition switch;
    an auxiliary antenna separate from said ignition antenna, said auxiliary antenna spaced from said ignition switch;
    a reader that detects presence of an authorized key for the vehicle adjacent to said ignition antenna and/or said auxiliary antenna;
    a switch between said auxiliary antenna, said ignition antenna and said reader, said switch selectively coupling said reader to either said ignition antenna or said auxiliary antenna; and
    wherein at least two authorized keys are functional with said ignition switch, a first one of said at least two authorized keys kept adjacent to said auxiliary antenna, and a second one of said at least two authorized keys being free to move for being carried by an authorized vehicle driver for use with said ignition switch.

2. The system of claim 1 wherein a secure location is provided spaced from said ignition switch, said auxiliary antenna located at said secure location.

3. The system of claim 2 wherein said secure location is a hidden location.

4. The system of claim 2 wherein said secure location is a lockable location.

5. The system of claim 1 wherein said first one of said at least two authorized keys has a machined blade at least partially removed therefrom.

6. The system of claim 1 wherein said switch includes a reader lead extending from a switch element to said reader, an ignition antenna lead extending from said switch element to said ignition antenna and an auxiliary antenna lead extending from said switch element to said auxiliary antenna, said switch element coupled to a controller.

7. The system of claim 1 wherein said switch is coupled to a controller, said controller configured to cause said switch to connect said reader to said auxiliary antenna to facilitate operation of the vehicle ignition.

8. The system of claim 7 wherein said controller is coupled to a transmission of the vehicle and keeps the vehicle transmission in a park position when said controller switches said reader to be connected to said auxiliary antenna, such that operating the vehicle ignition when said reader is coupled to said auxiliary antenna does not allow vehicle movement.

9. The system of claim 1 wherein a default position for said switch is with said reader connected to said ignition antenna.

10. The system of claim 1 wherein said at least two authorized keys are the same.

11. A method for automatic operation of a vehicle ignition, the method including the steps of:
    interposing a switch between an ignition antenna adjacent to an ignition switch of a vehicle and a reader that detects the presence of a first authorized key for the vehicle adjacent to the ignition antenna;
    locating an auxiliary antenna at a location spaced from the ignition switch and adjacent to a second authorized key for the vehicle; and
    configuring the switch to be selectively connected to the auxiliary antenna, so that when so selected, the reader detects the second authorized key through the auxiliary antenna and allows vehicle ignition operation.

12. The method of claim 11 including the further step of adjusting the switch to connect the auxiliary antenna to the reader to allow vehicle ignition operation.

13. The method of claim 12 wherein said adjusting step occurs automatically when a controller coupled to the switch calls for vehicle ignition operation.

14. The method of claim 11 wherein said locating step includes locating the auxiliary antenna and the second authorized key at a secure location.

15. The method of claim 11 wherein the reader is coupled to either the ignition antenna or the auxiliary antenna, with a default being with the reader coupled to the ignition antenna.

16. The method of claim 11 including the further step of operating the vehicle ignition with the first authorized key separate from the second authorized key adjacent to the auxiliary antenna, by the first authorized key being brought adjacent to the ignition switch with a mechanical blade of the first authorized key placed into a key slot of the ignition switch, and with the reader detecting the first authorized key through the ignition antenna.

17. The method of claim 16 including the further step of removing a mechanical key blade from the second authorized key adjacent to the auxiliary antenna, such that even if the second authorized key adjacent to the auxiliary antenna is found by an unauthorized individual, the second authorized key cannot be used in a key slot of the ignition switch of the vehicle.

18. The method of claim 11 including the further step of locking a transmission of the vehicle in a park setting when the reader is connected to the auxiliary antenna by the switch.

19. The method of claim 11 where the authorized key adjacent to the ignition antenna in said interposing a switch step is the same as the authorized key adjacent to the auxiliary antenna in said locating an auxiliary antenna step.

* * * * *